April 16, 1935.  R. PUDELKO  1,997,743
METER
Filed Aug. 28, 1928
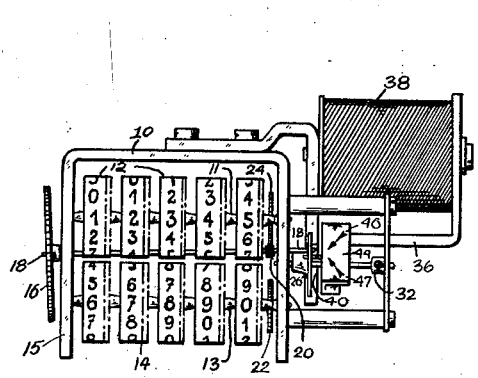
Fig. 1.
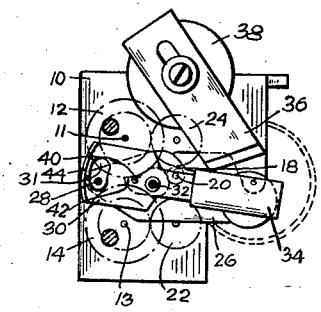
Fig. 2.
Fig. 3.
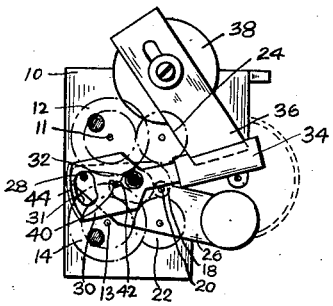
Fig. 4.
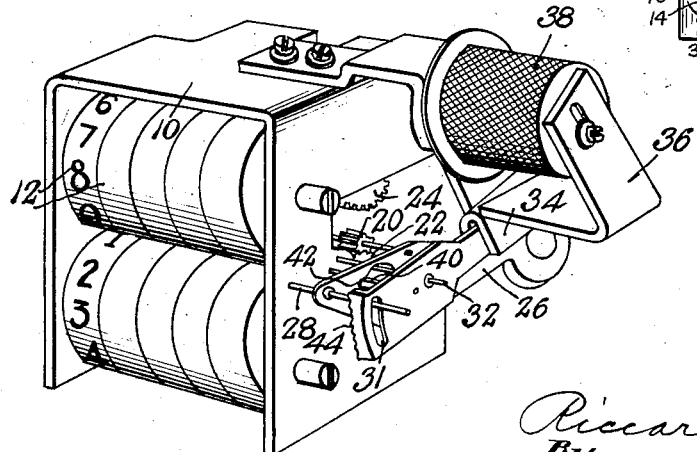
Inventor:
Riccard Pudelko
By John D. Morgan
Attorney.

Patented Apr. 16, 1935

1,997,743

UNITED STATES PATENT OFFICE 1,997,743

METER

Riccard Pudelko, Zug, Switzerland, assignor to Landis & Gyr, A.-G., a joint-stock company of Switzerland Application August 28, 1928, Serial No. 302,616
In Switzerland September 30, 1927

2 Claims. (Cl. 235—92)

This invention relates to novel and useful improvements in meters for measuring the consumption of electrical energy and more particularly to such improvements in multiple rate meters in which the meter selectively registers the current traversing a circuit on a plurality of registers in order that a different tariff may be charged for the energy so registered by each of the registering mechanisms.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates one embodiment of the invention, and together with the description, serves to explain the principles of the invention.

Of the drawing:

Fig. 1 is an elevation of the registering mechanism showing one embodiment of my invention;

Fig. 2 is an end elevation looking from the right of Fig. 1, certain parts having been cut away for the sake of clearness;

Fig. 3 is an end elevation similar to Fig. 2 but with the lower register connected to the meter;

Fig. 4 is a perspective view of the embodiment shown in the other figures of the drawing.

This invention provides a simple and very effective novel means of alternatively driving any one of a plurality of registering mechanisms whereby the energy consumed in a circuit may be registered in several portions, each of which may be at a different tariff rate, the selection of the register being controlled by the existence of any desired condition to which the mechanism may be made responsive. In the embodiment here shown, the control is effected by electro-magnetic means, so constructed that the magnet is energized only during a small portion of the time during which the meter is in use. More fully to accomplish the ends of my invention, the control means is preferably so constructed that the electro-magnetic means will be energized during the low-tariff rate registering period, which, in practice is generally of much shorter duration than the high tariff rate period, thereby effecting a considerable saving in energy which would otherwise be wasted, and at the same time greater accuracy of the meter is obtained due to the shorter time the magnet is energized resulting in a minimum error of registration caused by temperature variations.

In the preferred embodiment of my invention as shown in the drawing, a frame 10 is provided upon which are mounted two shafts 11 and 13 carrying respectively two registering trains 12 and 14, provided with the conventional ten-to-one transmission mechanism between successive wheels, registering train 12 indicating the consumption of energy at the high tariff rate and register 14 indicating that consumed at the low tariff rate. At one end 15 of the frame 10 is a gear 16 mounted on vertically movable or tiltable shaft 18 and adapted to be driven from the spindle of an integrating meter not shown, which shaft carries, near its other end, a pinion 20 alternatively and selectively engageable with gear 22 or 24 for driving either the high-tariff-rate register 12 or the low-tariff-register 14. A weighted lever 26 pivoted on shaft 28 for limited movement forms an oscillatable mounting for the right-hand end of shaft 18, as shown in Fig. 1, thereby permitting pinion 20 to be shifted between gears 22 and 24. A second lever 30 pivoted on shaft 32 in the same plane with shaft 28 is provided with an armature 34 adapted to be attracted by pole piece 36 magnetically energized by electro-magnet 38 when the energy is to be registered on low-rate meter. Shaft 32 extends through a relatively large slot in lever 26, said slot being of a sufficient size to permit movement of the lever 26 to shift pinion 20 between gears 22 and 24.

An aperture 31 formed in lever 30 and through which extends shaft 28 permits limited movement of the lever. Lever 30 has mounted thereon an inwardly projecting pin 40 bearing against flat upper portion 42 of an aperture formed in the lever 26. Due to the weight of armature piece 34, the pinion 20 is normally raised into engagement with gear 24 by this compound lever system, but when magnet 38 is energized the armature is lifted, thereby allowing lever 26, on which shaft 18 is mounted, to rotate clockwise and cause pinion 20 to mesh with gear 22 of the low tariff rate register 14.

In order that the customer may readily determine which of the registers is being driven by the meter, a segmental portion 44, formed on the front end of lever 30, is provided with indicating arrows 46 and 47, one of which is visible through a small overlying aperture not shown in the drawing. By this construction, the indicating arrow which is visible through the aperture points to the driven register.

When the electromagnet 38 is not energized the weighted armature 34 holds pinion 20 in engagement with the gear 24, of the high-tariff-rate register, as shown in Fig. 2, and this is the normal position of the mechanism. When the armature is energized, as would be the case when a predetermined amount of energy has been consumed, the armature 34 is raised magnetically and allows weighted lever 26 to lower pinion 20 into engagement with gear 22. By reason of the fact that the low-tariff rate generally obtains only for a short period compared to the high-tariff-rate, the electromagnet need be energized for only a small portion of the time the meter is in use and the remainder of the period to be measured finds the magnet de-energized with a consequent saving in power.

It is to be understood that registering mechanism of the type shown in this application may be selectively controlled by any one of a number of factors. The alternative action of the registers may be determined by the amount of current which has been consumed in a circuit as compared with a predetermined amount, or the high-tariff-rate register may be brought into operation when the current exceeds a predetermined, fixed value, or again, the meter may register on one registering mechanism only during certain hours of the day.

The invention in its broader aspects is not limited to the specific mechanisms shown and described but departures may be made therefrom within the scope of the accompanying claims without departing from the principles of the invention and without sacrificing its chief advantages.

What I claim is:—

1. In a multiple rate meter having a plurality of registers for registering energy at different rates and a common driving member to actuate said registers, the combination of means for shifting said driving member including a lever for moving the driving means into engagement with either of the registers, a weight to hold said driving means in engagement with one of said registers, a second weight to move the lever and thereby the driving means in engagement with the other register, and an electromagnet for moving said second weight.

2. In a multiple rate meter having a plurality of registers for registering energy at different rates and a common driving member to actuate said registers, the combination of means for shifting said driving member including a lever in which the driving member is mounted, a weighted pivoted armature forming a compound lever with said lever said compound lever normally positioning the driving member in driving relation with one of the registers, and electromagnetic means to move said armature to permit gravital movement of the driving member.

RICCARD PUDELKO.